A. LOHBERGER.
PLOW.
APPLICATION FILED JUNE 7, 1920.

1,419,743.

Patented June 13, 1922.
2 SHEETS—SHEET 1.

Inventor
Andrew Lohberger,

By G. Hume Talbert
Attorney

A. LOHBERGER.
PLOW.
APPLICATION FILED JUNE 7, 1920.

1,419,743.

Patented June 13, 1922.
2 SHEETS—SHEET 2.

Inventor
Andrew Lohberger,
By
E. Hume Talbert
Attorney

UNITED STATES PATENT OFFICE.

ANDREW LOHBERGER, OF TOLEDO, OHIO.

PLOW.

1,419,743.

Specification of Letters Patent.  Patented June 13, 1922.

Application filed June 7, 1920.  Serial No. 387,063.

*To all whom it may concern:*

Be it known that I, ANDREW LOHBERGER, a citizen of the United States of America, residing at Toledo, in the county of Lucas and State of Ohio, have invented new and useful Improvements in Plows, of which the following is a specification.

The object of the invention is to provide a turning plow particularly adapted for use in turning under grass and like surface growth and simultaneously breaking up the clods so as to produce a relatively pulverized and cultivated condition of the soil treated thereby, under conditions minimizing the resistance offered to the progress of the implement, and furthermore to provide a construction of the type indicated which may be readily converted into a means for effectively harvesting potatoes and like products and separating them from the soil without involving the necessity of special treatment upon the part of the operator, and with these objects in view, the invention consists in a construction and combination of parts of which a preferred embodiment is shown in the accompanying drawings, wherein:—

Figure 1:
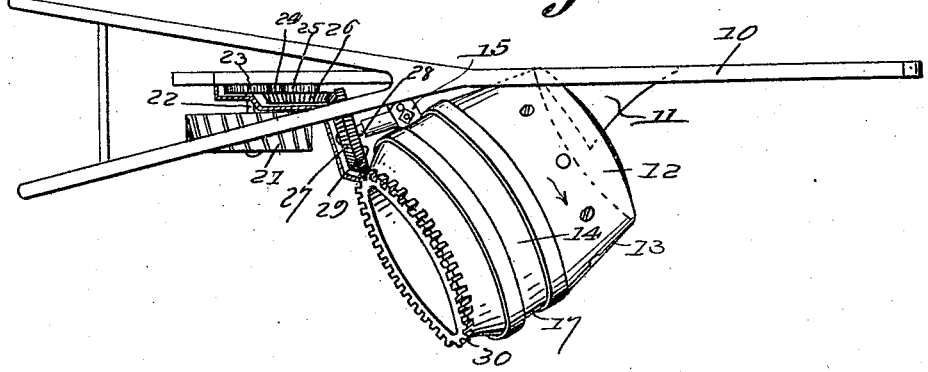
Figure 1, is a plan view of an implement embodying the invention.
Figure 2:
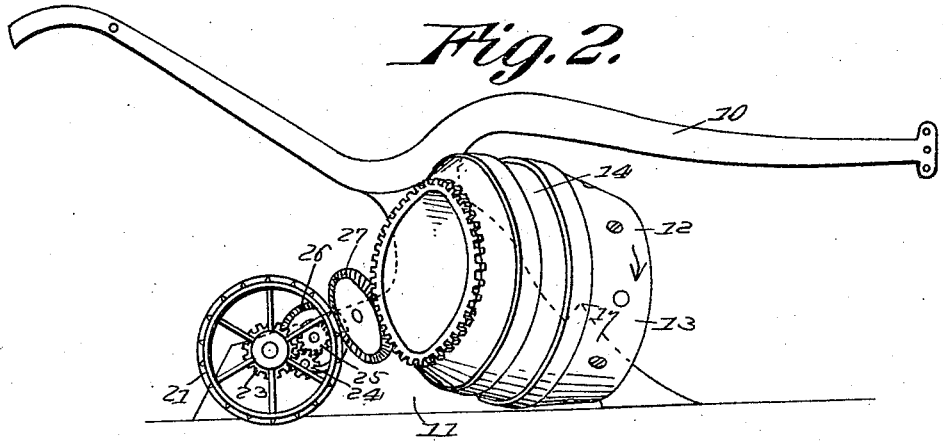
Figure 2, is a side view of the same looking at the mold-board.
Figure 3:
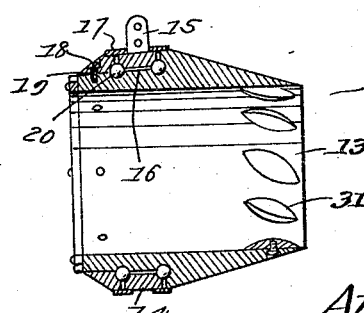
Figure 3, is a detail sectional view of the revolving mold-board.
Figure 4:
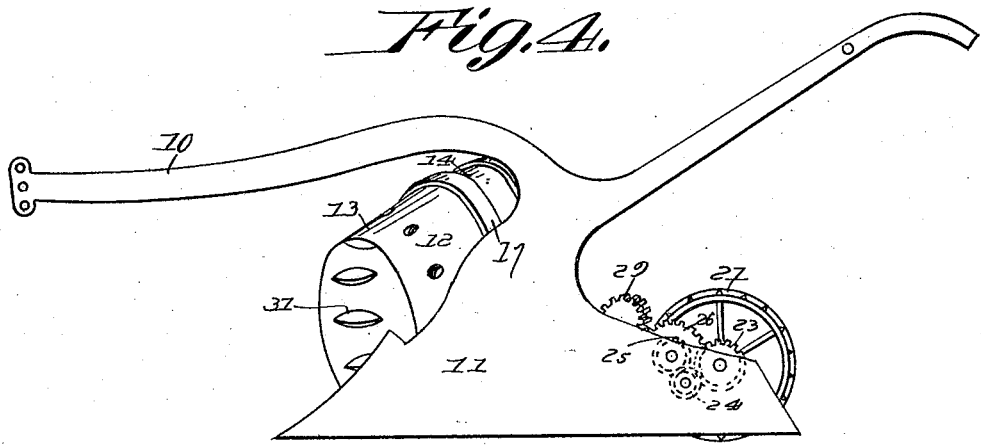
Figure 4, is a side view looking at the machine from the land side.

Carried by the beam 10 which is suitable for connection with any preferred draught mechanism and may be attached to a tractor, is a furrow opening plow 11, at one side of which is arranged a mold-board consisting of a revoluble drum 12 of substantially cylindrical form disposed with its axis on an oblique line with relation to the path of the machine, the inclination of said axis being upward and rearward and at the same time laterally rearward as will be obvious by reference to and a comparison of Figures 1 and 2 of the drawing, to the end that the forwardly tapered soil engaging portion thereof, as indicated at 13 and which for convenience will be referred to as the tread portion of the barrel, is so disposed that the forward progress of the plow has a tendency to cause a rotary movement of the drum in the direction indicated by the arrow in Figures 1 and 2. This rotary movement of the drum has the effect of completely turning or reversing the soil as it is received by the drum from the furrow opening plow or tool to the end that the grass or weeds covering the normal surface thereof are turned downward into the furrow to minimize the tendency of the grass or weeds to sprout or grow and utilize to the utmost the fertilizing effect of the normal surface growth by causing it to rot in the ground. Obviously such a disposition of the grass or weeds is desirable as a means of retaining in the soil the properties which are incident to its fertilization and which serve to promote the growth of crops planted therein.

In the construction illustrated, the revolubly mounted drum is mounted by employing a bearing ring or annular band 14 provided for example with an ear 15 which is bolted or otherwise rigidly secured to the frame of the structure and provided with an annular seat 16 in which said ring or band is fitted and is held by means of a retainer 17, a removable keeper 18 being bolted as indicated at 19 in position to be detached to release the drum when removal thereof from the bearing is desired. Anti-friction bearing means such as the balls 20 may be employed to minimize the friction and permit the unobstructed rotary movement of the drum.

Whereas when the drum is in certain kinds of soil it will rotate sufficiently to insure effective turning of the earth without assistance, due to the motion which it receives by reason of the contact of the tread surface 13 with the soil there are occasions in connection with soil of other kinds wherein assistance is necessary and in order that the rotary movement of the drum may be ensured under all conditions, it is preferable to provide a ground wheel 21 for rotation in the path of progress of the machine and provided with a shaft or spindle 22 carrying a gear 23 which communicates motion through an intermediate pinion 24 to a gear 25 of which the spindle is connected by inter-meshing bevel gears 26 and 27 with a spindle 28 carrying a gear 29 which in turn meshes with a toothed ring 30 on the rear end of the drum. It will be understood, however, that this is a train of gearing by which motion may be communicated from a ground wheel such as that indicated at 21 to the drum and is subject to modification to suit the preferred angular arrangement of the drum of the particular construction of the agricultural implement in connection with which the turning means represented by the drum may be used. The main point is to provide supplemental means actuated by a ground wheel by which positive rotary movement may be communicated to the drum to assist in the rotation of the latter when the conditions of the soil are such that the contact of the tread portion 13 of the drum with the soil is insufficient to insure the regular and effective rotation necessary to cause a complete reversal of the soil turned up by means of a furrow opening plow.

Figure 5:
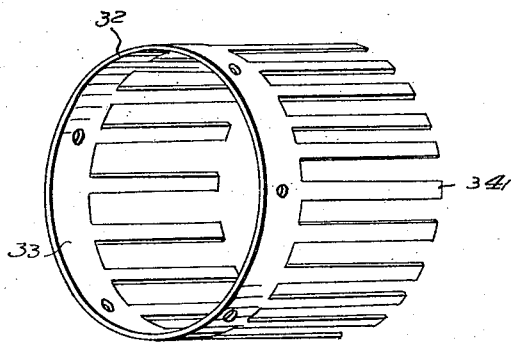
Figure 5, is a detail view in perspective of a potato harvesting attachment.

The mechanism described can be effectively used in harvesting potatoes and the like by connecting with a drum which is preferably provided with interior soil pulverizing projections 31, a cylindrical cage 32 shown in detail in Figure 5 and consisting of a band 33 which may be fitted within the rear end of the drum and attached by any suitable means and fingers 34 which serve to separate the earth from the product allowing the soil to drop between the fingers while the product is deposited upon the surface of the ground in rear of the implement.

The invention having been described, what is claimed as new and useful is:—

1. The combination with a plow of a revoluble mold board consisting of a drum axially disposed in oblique relation to the path of movement of the plow, means for communicating rotary motion to the drum and a cylindrical fingered cage projecting from and parallel with the drum.

2. The combination with a plow, of a revoluble mold-board consisting of a drum of substantially cylindrical form and having an exterior annular seat, a bearing ring in surrounding relation to the drum and engaged in said annular seat and provided with an ear by which it is secured to the plow frame, and means for communicating rotation to the drum as a result of advance movement of the plow.

3. The combination with a plow of a revoluble mold-board consisting of a hollow drum, means for communicating rotary movement to the same, soil pulverizing projections secured to the inner periphery of the drum, and a band removably secured to the inner periphery of the drum at the end remote from said projections and formed with fingers projecting from and parallel with the drum for the purpose specified.

In testimony whereof he affixes his signature.

ANDREW LOHBERGER.